(12) United States Patent
Zhao et al.

(10) Patent No.: US 11,158,324 B2
(45) Date of Patent: Oct. 26, 2021

(54) SPEAKER SEPARATION MODEL TRAINING METHOD, TWO-SPEAKER SEPARATION METHOD AND COMPUTING DEVICE

(71) Applicant: Ping An Technology (Shenzhen) Co., Ltd., Shenzhen (CN)

(72) Inventors: Feng Zhao, Shenzhen (CN); Jianzong Wang, Shenzhen (CN); Jing Xiao, Shenzhen (CN)

(73) Assignee: Ping An Technology (Shenzhen) Co., Ltd., Shenzhen (CN)

( * ) Notice: Subject to any disclaimer, the term of this patent is extended or adjusted under 35 U.S.C. 154(b) by 7 days.

(21) Appl. No.: 16/652,452

(22) PCT Filed: Aug. 13, 2018

(86) PCT No.: PCT/CN2018/100174
§ 371 (c)(1),
(2) Date: Mar. 31, 2020

(87) PCT Pub. No.: WO2019/227672
PCT Pub. Date: Dec. 5, 2019

(65) Prior Publication Data
US 2020/0234717 A1 Jul. 23, 2020

(30) Foreign Application Priority Data
May 28, 2018 (CN) .......................... 201810519521.6

(51) Int. Cl.
*G10L 17/04* (2013.01)
*G10L 17/18* (2013.01)
*G10L 21/0272* (2013.01)

(52) U.S. Cl.
CPC .............. *G10L 17/04* (2013.01); *G10L 17/18* (2013.01); *G10L 21/0272* (2013.01)

(58) Field of Classification Search
CPC ...... G10L 17/04; G10L 17/18; G10L 21/0272
See application file for complete search history.

(56) References Cited

U.S. PATENT DOCUMENTS

2005/0182626 A1 8/2005 Kim et al.
2018/0174600 A1* 6/2018 Chaudhuri ......... H04N 21/4666
(Continued)

FOREIGN PATENT DOCUMENTS

CN 107342077 A 11/2017
CN 107680611 A 2/2018
(Continued)

OTHER PUBLICATIONS

Luo, Y., Chen, Z., & Mesgarani, N. (2018). Speaker-independent speech separation with deep attractor network. IEEE/ACM Transactions on Audio, Speech, and Language Processing, 26(4), 787-796.*

(Continued)

*Primary Examiner* — Bryan S Blankenagel
(74) *Attorney, Agent, or Firm* — ScienBiziP, P.C.

(57) ABSTRACT

A speaker acquires audio data and performing processing. Audio features of the audio data are extracted. The audio features are inputted into a preset neural network model for training to obtain vector features. A first similarity value between a first vector feature and a second vector feature of a first speaker and a second similarity value between the first vector feature and a third vector feature of a second speaker are calculated. A loss function value is calculated and when is less than or equal to a preset loss function threshold, a training process of the speaker separation model is ended and parameters are updated. A two-speaker separation method, a terminal, and a storage medium are disclosed. Feature extraction capabilities of the model are enhanced, (Continued)

and accuracy of separation between speakers is improved, especially in long meetings and conversations.

15 Claims, 4 Drawing Sheets

(56) References Cited

U.S. PATENT DOCUMENTS

| | | | |
|---|---|---|---|
| 2019/0212523 A1 | | 7/2019 | Nagayama et al. |
| 2019/0318754 A1* | | 10/2019 | Le Roux ................. G10L 19/02 |
| 2019/0324553 A1* | | 10/2019 | Liu ......................... G06Q 50/01 |

FOREIGN PATENT DOCUMENTS

| | | |
|---|---|---|
| JP | H02-072398 | 3/1990 |
| JP | 2008-051907 | 3/2008 |
| JP | 2016-197200 | 11/2016 |
| JP | 2017-120595 | 7/2017 |
| WO | 2018/013200 | 1/2018 |
| WO | 2018/049313 | 3/2018 |
| WO | 2018/069974 | 4/2018 |

OTHER PUBLICATIONS

Tu, Y., Du, J., Xu, Y., Dai, L., & Lee, C. H. (Oct. 2014). Deep neural network based speech separation for robust speech recognition. In 2014 12th International Conference on Signal Processing (ICSP) (pp. 532-536). IEEE.*

Li, C., Zhu, L., Xu, S., Gao, P., & Xu, B. (Apr. 2018). CBLDNN-based speaker-independent speech separation via generative adversarial training. In 2018 IEEE International Conference on Acoustics, Speech and Signal Processing (ICASSP) (pp. 711-715). IEEE.*

Herve Bredin, TristouNet: Triplet loss for speaker turn embedding, In twrnational Conference on Acoustic, Speech and Signal Processing, IEEE, Jun. 19, 2017, 2017, pp. 5430-5434, URL, ieeexplore.ieee.org/stanp.jsp?arnumber=7953194.

* cited by examiner

SPEAKER SEPARATION MODEL TRAINING METHOD, TWO-SPEAKER SEPARATION METHOD AND COMPUTING DEVICE

CROSS-REFERENCE TO RELATED APPLICATIONS

This application claims priority of Chinese Patent Application No. 201810519521.6, entitled "speaker separation model training method, two-speaker separation method and related equipment" filed on May 28, 2018 in the China National Intellectual Property Administration (CNIPA), the entire contents of which are incorporated by reference herein.

FIELD

The present disclosure relates to a technical field of biometrics, specifically a speaker separation model training method, a two-speaker separation method, a terminal, and a storage medium.

BACKGROUND

Separating and obtaining specific human voices from others within massive amounts of data, such as telephone recordings, news broadcasts, conference recordings, etc. is often necessary. Speaker separation technology refers to a process of automatically dividing speech according to the speakers from a multi-person conversation and labeling it, to solve a problem of "when and who speaks."

Separation of two speakers refers to separating recordings of two speakers speaking one after the other on the same audio track into two audio tracks, each audio track containing the recording of one speaker. The separation of two speakers is widely used in many fields, and has extensive needs in industries and fields such as radio, television, media, and customer service centers.

Traditional speaker separation technology that uses Bayesian Information Criterion (BIC) as a similarity measure can achieve better results in a separation task of short-term conversations, but as the duration of the conversations increases, the Single Gaussian model of the BIC is not enough to describe the distribution of different speaker data, so speaker separation capability is poor.

SUMMARY

In view of the above, it is necessary to propose a speaker separation model training method, a two-speaker separation method, a terminal, and a storage medium are disclosed. Training the speaker separation model in advance significantly enhances a feature extraction capability of the model on input speech data and reduce a risk of performance degradation when the network level deepens; separating the two speaker's speech according to the trained speaker separation model improves an accuracy of the two-speaker separation, especially for lengthy conversations.

A first aspect of the present disclosure provides a speaker separation model training method, the method includes:
  acquiring a plurality of audio data of multiple speakers;
  processing each of the plurality of audio data:
  extracting audio features of the processed audio data;
  inputting the audio features into a preset neural network model for training to obtain vector features;
  selecting a first vector feature and a second vector feature of a first speaker, and calculating a first similarity value between the first vector feature and the second vector feature according to a preset first similarity function;
  selecting a third vector feature of a second speaker, and calculating a second similarity value between the first vector feature and the third vector feature according to a preset second similarity function;
  inputting the first similarity value and the second similarity value into a preset loss function to calculate a loss function value; and when the loss function value is less than or equal to a preset loss function threshold, ending the training process of the speaker separation model, and updating parameters in the speaker separation model.

A second aspect of the present disclosure provides a two-speaker separation method, the method includes:
  1) processing a speech signal to be separated;
  2) establishing a first sliding window and a second sliding window that are adjacent to each other and sliding from a starting position of the processed speech signal, and obtaining a first speech segment and a second speech segment according to segmentation point of the first sliding window and the second sliding window;
  3) inputting the first speech segment into a speaker separation model to extract feature to obtain a first speech vector, and inputting the second speech segment into the speaker separation model to extract feature to obtain a second speech vector;
  4) calculating a distance value between the first speech vector and the second speech vector as a distance value corresponding to the segmentation point;
  5) moving the first sliding window and the second sliding window simultaneously along a time axis direction for a preset time period, and repeating steps 2)-5) until the second sliding window reaches an end of the processed speech signal;
  6) acquiring distance value corresponding to each segmentation point, and determining local maximum values according to all the distance values;
  7) segmenting the speech signal to be separated according to the segmentation points corresponding to the local maximum values to obtain new speech segments;
  8) clustering the new speech segments into speech segments of two speakers.

A third aspect of the present disclosure provides a terminal, the terminal includes a processor and a storage device, and the processor executes computer-readable instructions stored in the storage device to implement the speaker separation model training method and/or the two-speaker separation method.

A fourth aspect of the present disclosure provides a non-transitory storage medium having stored thereon computer-readable instructions that, when the computer-readable instructions are executed by a processor to implement the speaker separation model training method and/or the two-speaker separation method.

The speaker separation model training method, the two-speaker separation method, the terminal, and the storage medium described in the present disclosure trains the speaker separation model in advance, which enhances a feature extraction capability of the model on input speech data, and reduces a risk of performance degradation when the network hierarchy deepens; separating the two speaker's speech according to the trained speaker separation model improves an accuracy of the two-speaker separation, especially for a long conversation.

Figure 1:
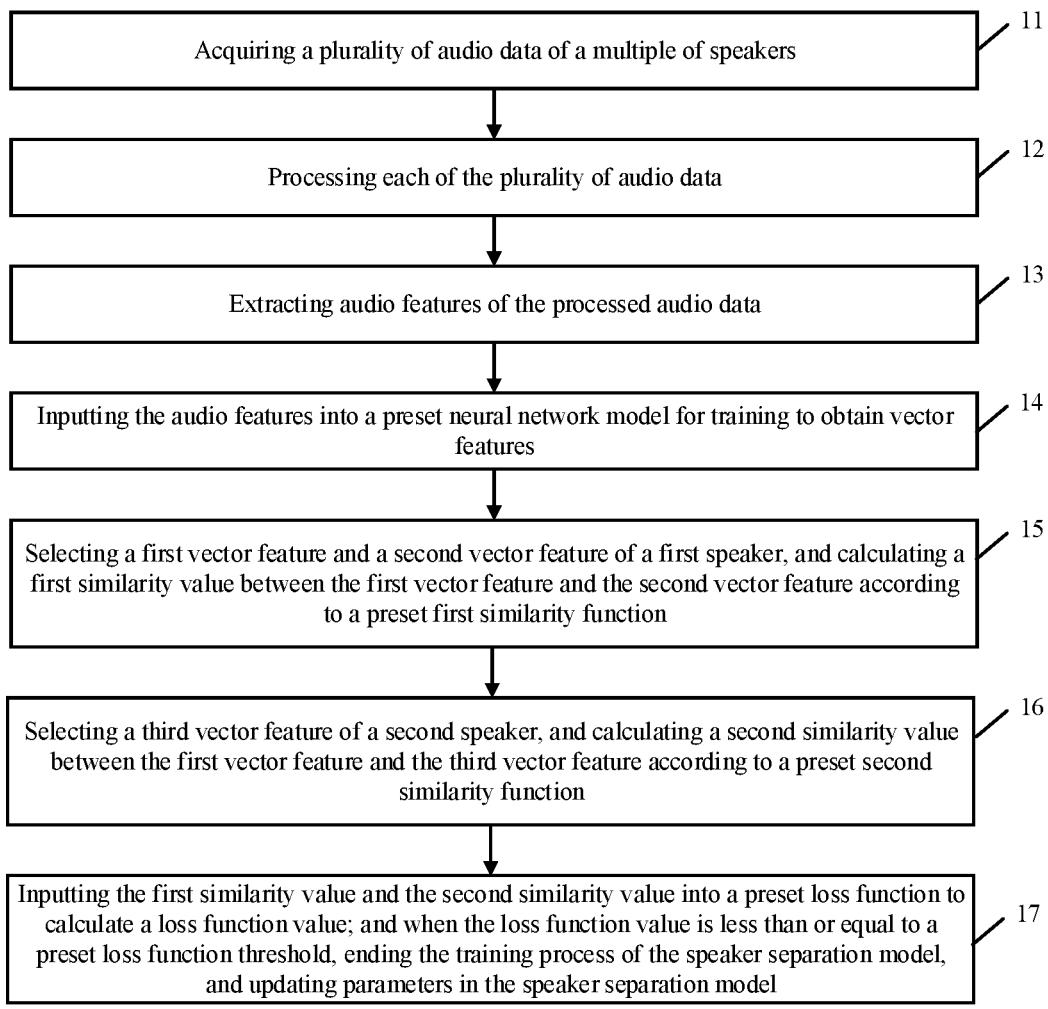
FIG. 1 shows a flowchart a speaker separation model training method provided in an embodiment of the present disclosure.

The following specific embodiments will further explain the present disclosure in combination with the above drawings.

DETAILED DESCRIPTION

For clarity, of illustration of objectives, features and advantages of the present disclosure, the drawings combined with the detailed description illustrate the embodiments of the present disclosure hereinafter. It is noted that embodiments of the present disclosure and features of the embodiments can be combined, when there is no conflict.

Various details are described in the following descriptions for better understanding of the present disclosure, however, the present disclosure may also be implemented in other ways other than those described herein. The scope of the present disclosure is not to be limited by the specific embodiments disclosed below.

Unless defined otherwise, all technical and scientific terms used herein have the same meaning as commonly understood by one of ordinary skill in the art to which the present disclosure belongs. The terms used herein in the present disclosure are only for the purpose of describing specific embodiments, and are not intended to limit the present disclosure.

The speaker separation model training method and/or the two speaker separation method in the embodiments of the present disclosure are applied to one or more electronic terminals. The speaker separation model training method and/or the two speaker separation method may also be applied to a hardware environment composed of a terminal and a server connected to the terminal through a network. The network includes, but is not limited to: a wide area network, a metropolitan area network, or a local area network. The speaker separation model training method and/or the two speaker separation method in the embodiment of the present disclosure can be executed by the server at the same time, or can be performed by the terminal at the same time, or may also be performed by the server and the terminal. The server separation model training method in the embodiment of the present disclosure is executed by the server, and the two speaker separation method in the embodiment of the present disclosure is executed by the terminal.

For a terminal that needs to perform the speaker separation model training method and/or the two speaker separation method, the speaker separation model training function and/or the two speaker separation function provided by the method of the present disclosure can be directly integrated on the terminal, or installed for a client for implementing the methods of the present disclosure. For another example, the methods provided in the present disclosure can also be run on a server or other device in the form of a Software Development Kit (SDK), and provide the speaker separation model training function and/or two speaker separation function in the form of an SDK interface. The terminal or other equipment can implement the speaker separation model training method and/or the two speaker separation method through the provided interface.

Embodiment One

FIG. 1 is a flowchart of a speaker separation training method in an embodiment of the present disclosure. According to different requirements, the order of the steps in the flow can be changed, and some steps can be omitted. Within each step, sub-steps can be sub-numbered.

In block 11, acquiring multiple speakers and a plurality of audio data for each speaker.

In the embodiment, the acquiring of the plurality of audio data may include the following two manners:

(1) An audio device (for example, a voice recorder, etc.) is set in advance, and the speeches of a plurality of people talking amongst themselves are recorded on-site through the audio device to obtain audio data.

(2) Acquire plurality of audio data from an audio data set.

The audio data set is an open source data set, such as a UBM data set and a TV data set. The open source audio data set is dedicated to training a speaker separation model and testing an accuracy of the trained speaker separation model. The UBM data set and the TV data set are from NIST04, NIST05 and NIST06, including about 500 h of audio data, recording a total of 577 speakers, with an average of about 15 sentences per person.

In block 12, processing each of the plurality of audio data.

In the embodiment, after acquiring the plurality of audio data, processing of the plurality of audio data is required. Processing of the audio data includes one or more of the following combinations:

1) performing noise reduction processing on the audio data;

The acquired audio data may contain various noises. In order to extract purest audio data from the original noisy audio data, a low-pass filter can be used to remove white noise and random noise in the audio data.

2) performing voice activity detection on the noise-reduced audio data, and deleting invalid audio to obtain standard audio data samples;

In the embodiment, a dual-threshold comparison method can be used for voice activity detection to detect valid audio and invalid audio in the audio data. The valid audio is voices speaking, and the invalid audio is relative to the valid audio, including but not limited to, mute passages which are recorded.

3) labeling the standard audio data samples to indicate the speaker to which each of the standard audio data samples belongs.

A label refers to an identity attribute tag representing the audio data. For example, a first audio data of speaker A is labeled with an identity attribute tag 01, a second audio data of speaker B is labeled with an identity attribute tag 02.

In block 13, extracting audio features of the processed audio data.

In the embodiment, Mel Frequency Cepstrum Coefficient (MFCC) spectral characteristics etc. can be used to extract the audio features of the processed audio data. The MFCC is known in the prior art and not described in detail in the present disclosure.

In block 14, inputting the audio features into a preset neural network model for training to obtain vector features.

In the embodiment, the preset neural network model is stacked using a neural network structure with a predetermined number of layers. The preset predetermined number of layers is a preset number of network layers. For example, 9-12 layers in a neural network structure are set in advance to train a neural network training model.

Specifically, each layer of the neural network structure includes: a first convolution layer, a first modified linear unit, a second convolution layer, and a second modified linear unit, an average layer, a fully connected layer, and a normalization layer. A convolution kernel of the convolution layer is 3*3, a step size is 1*1, and a number of channels is 64;

A specific process of training the preset neural network model based on the input audio features includes:

1) inputting the audio feature into the first convolution layer to perform a first convolution process to obtain a first convolution feature;

2) inputting the first convolution feature into the first modified linear unit to perform a first modified process to obtain a first modified feature;

3) inputting the first modified feature into the second convolution layer to perform a second convolution process to obtain a second convolution feature;

4) summing the audio feature and the second convolution feature and inputting the sum into the second modified linear unit to obtain a second modified feature;

5) inputting the second modified feature to the average layer, the fully connected layer, and the normalization layer in order to obtain a one-dimensional vector feature.

A function of the average layer can be as a temporary pool ("temporary pool" used to calculate an average value of vector sequences along the time axis). The average layer calculates an average value of vector sequences output from a previous long-term short-term memory network to obtain a forward average vector and an average value of vector sequences output from a backward long-term short-term memory network to obtain a backward average vector. The fully connected layer concatenates the forward average vector and the backward average vector into one vector. The normalization layer uses a normalization function to process the concatenated vector to obtain a normalized one-dimensional vector feature with a length of 1.

In the embodiment, the normalization function can be a Euclidean distance function, a Manhattan distance function, and a minimum absolute error function. Optionally, the Euclidean distance function is used to normalize the concatenated vector processed by the fully connected layer to obtain a normalized one-dimensional vector feature. The normalization process can compress the concatenated vector process by the fully connected layer, so that the concatenated vector processed by the fully connected layer is robust, thereby further improving a robustness of the speaker separation model. In addition, the normalization using the Euclidean distance function prevents the speaker separation model from overfitting, thereby improving a generalization ability of the speaker separation model. Subsequently optimizing neural network parameters in the speaker separation model becomes more stable and faster.

In block 15, selecting a first vector feature and a second vector feature of a first speaker, and calculating a first similarity value between the first vector feature and the second vector feature according to a preset first similarity function.

In the embodiment, the preset first similarity function can be a cosine similarity function, as shown (in formula (1-1)) below:

$$COS(x_i, x_j) = x_i^T x_j \qquad (1-1)$$

Wherein, $x_i$ represents the first vector feature of the first speaker, $x_j$ represents the second vector feature of the first speaker and $COS(x_i, x_j)$ is the calculated first similarity value.

In block 16, selecting a third vector feature of a second speaker, and calculating a second similarity value between the first vector feature and the third vector feature according to a preset second similarity function.

In the embodiment, the preset second similarity function can be same as or different from the preset first similarity function.

Optionally, the preset second similarity function is an LP norm, as shown in the following formula (1-2):

$$L_p(x_i, y_i) = \left( \sum_{i=1}^{n} |x_i - y_i|^p \right)^{1/p} \qquad (1-2)$$

Wherein, $x_i$ represents the first vector feature of the first speaker, $y_i$ represents the third vector feature of the second speaker, and $L_p(x_i, y_i)$ is the calculated second similarity value, n is a number of binary arrays (xi, yi).

In block 17, inputting the first similarity value and the second similarity value into a preset loss function to calculate a loss function value; and when the loss function value is less than or equal to a preset loss function threshold, ending the training process of the speaker separation model, and updating parameters in the speaker separation model.

In the embodiment, the preset loss function can be as shown in the following formula (1-3):

$$L = \sum_{i}^{N} \max(S_i^{13} - S_i^{12} + \alpha, 0) \qquad (1-3)$$

wherein, $\alpha$ is a normal number and generally ranges from 0.05 to 0.2. $S_i^{13}$ is the second similarity value, that is, a value of similarity between the first vector feature of the first speaker and the third vector feature of the second speaker. $S_i^{12}$ is the first similarity value, that is, a similarity between the first vector feature of the first speaker and the second vector feature of the first speaker. L is the calculated loss function value, N is a number of ternary array (xi, xj, yi).

The present disclosure acquires a plurality of audio data as training samples and labels the audio data. Audio features of the audio data are extracted. Vector features are obtained by inputting the audio features into a preset neural network model for training. A first vector feature and a second vector feature of a first speaker are selected, and a first similarity value between the first vector feature and the second vector feature is calculated according to a preset first similarity function. A third vector feature of a second speaker is selected, and a second similarity value between the first vector feature and the third vector feature is calculated according to a preset second similarity function. The first similarity value and the second similarity value are inputted into a preset loss function to calculate a loss function value; and when the loss function value is less than or equal to a preset loss function threshold, the training process of the speaker separation model is ended, and parameters in the speaker separation model are updated. The speaker separation model for training based on the convolutional neural network in the present disclosure has strong feature extraction capabilities, which reduces a risk of performance degradation when the network level deepens. In addition, vector features of different audio data of the same speaker can be guaranteed to be the same as much as possible, and vector features of the audio data of different speaker are as different as possible, so that the calculated loss function can match the convergence condition faster and record and save the speaker. Training time of the speaker separation model is saved, and a separation efficiency of the speaker separation model is improved.

Embodiment Two

Figure 2:
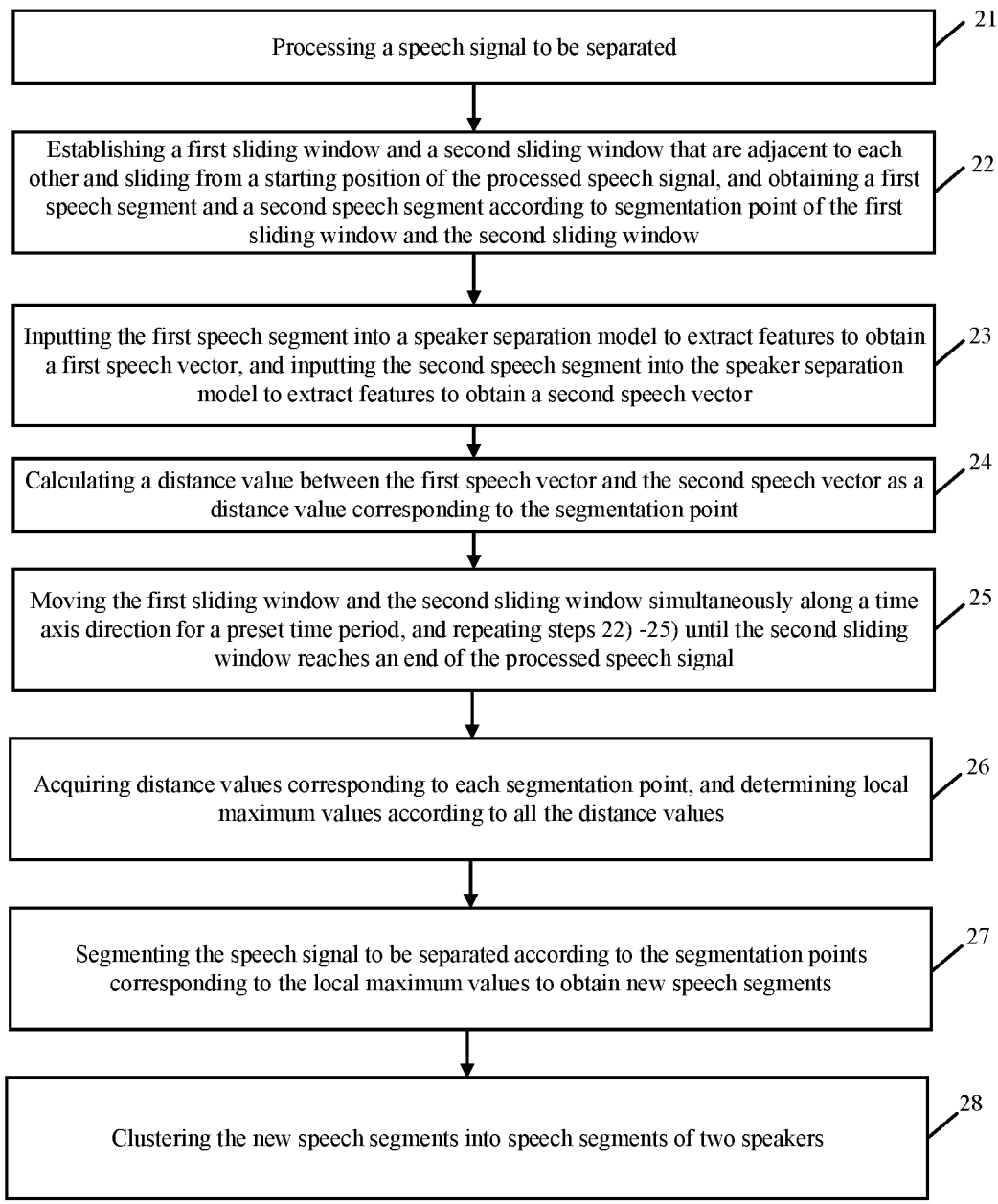
FIG. 2 shows a flowchart of a two-speaker separation method provided in an embodiment of the present disclosure.

FIG. 2 is a flowchart of a method for two-speaker separation in an embodiment of the present disclosure. According to different requirements, the order of the steps in the flow can be changed, and some can be omitted. Within each step, sub-steps can be sub-numbered.

In block 21, processing a speech signal to be separated.

In the embodiment, a process of processing the speech signal to be separated includes:

1) Pre-Emphasis Processing

In the embodiment, a digital filter can be used to perform pre-emphasis processing on the speech signal to be separated to improve a speech signal of the high-frequency part. The details are shown below in formula (2-1):

$$\tilde{S}(n)=S(n)-a*S(n-1) \tag{2-1}$$

wherein, S(n) is the speech signal to be separated, a is a pre-emphasis coefficient and 0.95 is generally taken, and $\tilde{S}(n)$ is a speech signal after the pre-emphasis processing.

Due to factors such as human vocal organs and equipment that collects speech signals, problems such as aliasing and higher-order harmonic distortion readily appear in the collected speech signals. By Pre-emphasis processing of the speech signal to be separated, the high-frequency parts of the speech signal that are suppressed by the pronunciation system can be compensated, and the high-frequency formants are highlighted to ensure that the speech signal to be separated is more uniform and smoother, and improve actual separation of the speech signal to be separated.

2) Framed Processing

The speech signal to be separated can be framed according to a preset framing parameter. The preset framing parameter can be, for example, a frame length of 10-30 ms. Optionally, the speech signal to be separated is framed every 25 milliseconds to obtain a plurality of speech frames. For the speech signal to be separated, each speech frame obtained after framing is a characteristic parameter time series composed of the characteristic parameters of each frame.

In block 22, establishing a first sliding window and a second sliding window that are adjacent to each other and sliding from a starting position of the processed speech signal, and obtaining a first speech segment and a second speech segment according to segmentation point of the first sliding window and the second sliding window.

In the embodiment, a length of the first sliding window and the second sliding window can be 0.7-2 seconds. A segmentation point between the first sliding window and the second sliding window is a possible speaker dividing point of the processed voice signal. The first sliding window corresponds to the first speech segment, and the second sliding window corresponds to the second speech segment. The segmentation point between the first sliding window and the second sliding window is also the segmentation point between the first speech segment and the second speech segment.

In block 23, inputting the first speech segment into a speaker separation model to extract feature to obtain a first speech vector, and inputting the second speech segment into the speaker separation model to extract feature to obtain a second speech vector.

The first speech segment is inputted into the trained speaker separation model, and the trained speaker separation model extracts an MFCC(Mel Frequency Cepstrum Coefficient) of the first speech segment to obtain a first speech vector. The second speech segment is inputted into the trained speaker separation model and the trained speaker separation model extracts an MFCC of the second speech segment to obtain a second speech vector.

In block 24, calculating a distance value between the first speech vector and the second speech vector as a distance value corresponding to the segmentation point.

In the embodiment, a preset distance function can be used to calculate a distance value between each first speech vector and each corresponding second speech vector. The preset distance function is a preset distance function, and can be, for example, a Euclidean distance. A process of calculating the distance value of the first speech vector and the second speech vector by using the European distance function is not described in the present disclosure.

In block 25, moving the first sliding window and the second sliding window simultaneously along a time axis direction for a preset time period, and repeating steps 22)-25) until the second sliding window reaches an end of the processed speech signal.

In the embodiment, the preset time period can be 5 ms. By sliding the first sliding window and the second sliding window on the processed voice signal, a plurality of segmentation points of the sliding window can be obtained, thereby obtaining a plurality of first speech fragments and a plurality of second speech fragments. That is, each time the first sliding window and the second sliding window are slid at the same time according to the preset time period, a candidate segmentation point is obtained. Each candidate segmentation point is the segmentation point of the first speech segment and the second speech segment, and a distance value can be calculated correspondingly. How many segmentation point there are will correspond to how many distance values there are.

In block 26, acquiring distance value corresponding to each segmentation point, and determining local maximum values according to all the distance values.

In the embodiment, a specific process of determining local maximum values according to all the distance values includes:

arranging the distance values corresponding to the division points in chronological order of the segmentation points;

determining f(n') whether it is greater than f(n'−1) and determining f(n') whether it is greater than f(n'+1), where f(n') is a distance value corresponding to the segmentation point n', f(n'−1) is a distance value corresponding to a segmentation point (n'−1) before the segmentation point n', and f(n'+1) is a distance value corresponding to a segmentation point (n'+1) after the segmentation point n';

when f(n')≥f(n'−1) and f(n')≥f(n'+1), determining f(n') is the local maximum.

A plurality of local maximum values can be determined, and a segmentation point corresponding to each local maximum value is a segmentation point to be found.

For example, suppose that 10 segmentation points are obtained according to the sliding of the first sliding window and the second sliding window, such as T1, T2, T3, T4, T5, T6, T7, T8, T9, and T10. Each segmentation points corresponds to a distance value, for example, S1, S2, S3, S4, S5, S6, S7, S8, S9, and S10. The 10 distance values are arranged in chronological order of the segmentation points. If S2>=S1 and S2>=S3, S2 is a local maximum value. Then determine whether S4>=S3, and S4>=S5. If S4>=S3, and S4>=S5, then S4 is a local maximum value. By analogy, the remaining current distance values are respectively determined from a previous distance value or a subsequent distance value to determine local maximum values.

In an alternative embodiment, the determining of local maximum values according to all the distance values can include:

drawing a smooth curve with the segmentation points as the horizontal axis and the distance values corresponding to the segmentation points as the vertical axis;

calculating a slope of a tangent to each point on the curve;

determining as the local maximum a distance value corresponding to the point where the slope of the tangent is zero.

Figure 3:
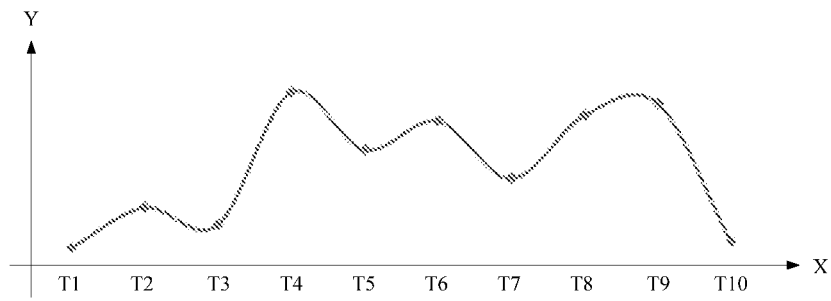
FIG. 3 shows a schematic diagram of determining a local maximum according to a segmentation point and a corresponding distance value provided in an embodiment of the present disclosure.

In order to visualize the local maximum values, a smooth curve can be drawn with the segmentation points as the horizontal axis and the distance values corresponding to the segmentation points as the vertical axis, as shown in FIG. 3. Solving a tangent of each point in FIG. 3 shows that a slope of the tangent of the points corresponding to S2, S4, S6, and S9 is zero, and S2, S4, S6, and S9 are determined as local maximum values.

In block 27, segmenting the speech signal to be separated according to the segmentation points corresponding to the local maximum values to obtain new speech segments.

In the embodiment, after determining the local maximum values, the speech signal to be separated is again segmented by using the segmentation points corresponding to the local maximum values as a new segmentation point, so as to obtain a plurality of new speech fragments. A process of re-segmentation is to find time points of dialogue exchange between two different speakers from the speech signal to be separated, and then the speech signal to be separated can be segmented into several speech segments according to the time points. Each speech segment contains the speech of only one speaker.

For example, if S2, S4, S6, and S9 are the local maximum values, the corresponding segmentation points T2, T4, T6, and T9 are used as new segmentation points to segment the speech signal to be separated, to obtain 5 new speech segments. Each new speech segment contains only one speaker's speech.

In block 28, clustering the new speech segments into speech segments of two speakers.

All speech segments belonging to one speaker are clustered by a clustering method and then recombined together.

In the embodiment, the clustering method can be a K-means clustering or a bottom-up hierarchical clustering (HAC). The clustering method is known in the prior art and is not described in detail in the present disclosure.

It can be known from the above that the present disclosure processes a speech signal to be separated. A first sliding window and a second sliding window that are adjacent to each other are established and sliding from a starting position of the processed speech signal. A first speech segment and a second speech segment are obtained according to a segmentation point of the first sliding window and the second sliding window. The first speech segment is inputted into a speaker separation model to extract feature to obtain a first speech vector, and the second speech segment is inputted into the speaker separation model to extract feature to obtain a second speech vector. A distance value between the first speech vector and the second speech vector is calculated as a distance value corresponding to the segmentation point. The sliding window can be moved according to a preset time period, and each time the sliding window is moved, two speech fragments are obtained until the second sliding window reaches the end of the pre-processed voice signal and the distance value corresponding to each segmentation point is obtained. A local maximum according to the distance value is determined and the speech signal to be separated is segmented according to a segmentation point corresponding to the local maximum to obtain a new speech segment. The new speech segment is clustered into the respective speech of different speakers. In the present disclosure, a plurality of speech fragments are obtained through several sliding processes. The trained speaker separation model is used to extract features of the speech fragments. By comparing the calculated distance values to determine the local maximum values, the segmentation points corresponding to the local maximum values are used as new segmentation points to segment the speech signal to be separated again, and the speech fragments of the two speakers are obtained, and the separation is effective.

The embodiments described above are only specific implementations of the present disclosure, but a scope of protection of the present disclosure is not limited to this. For those of ordinary skill in the art, without departing from the creative concept of this disclosure, they can also make improvements, but these all belong to the scope of this disclosure.

Figure 4:
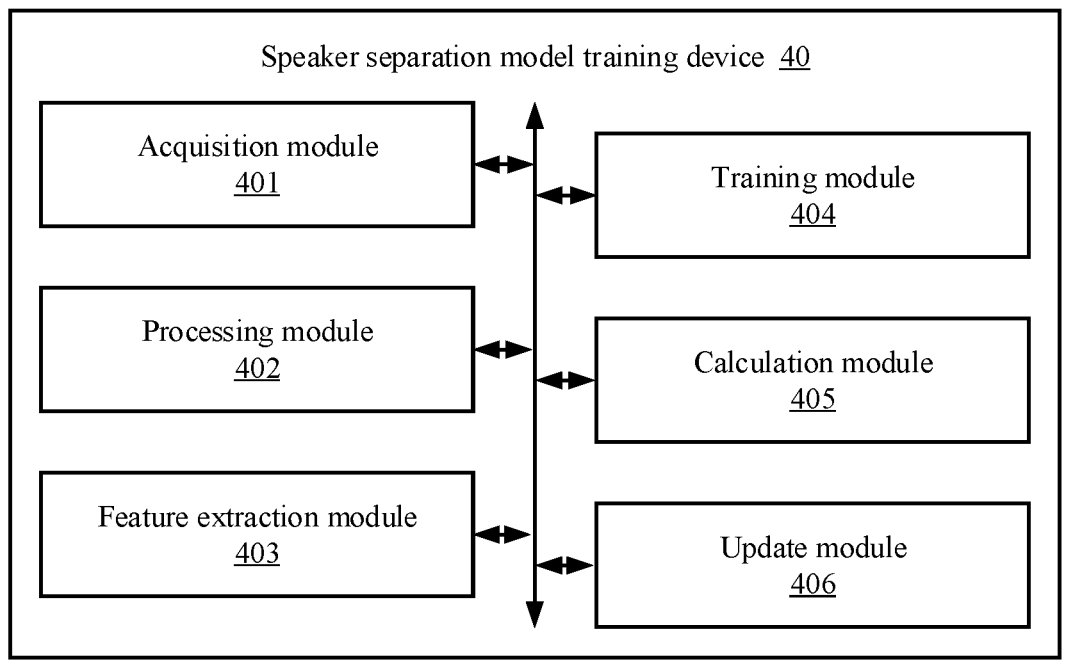
FIG. 4 shows a schematic structural diagram of a speaker separation model training device provided in an embodiment of the present disclosure.
Figure 5:
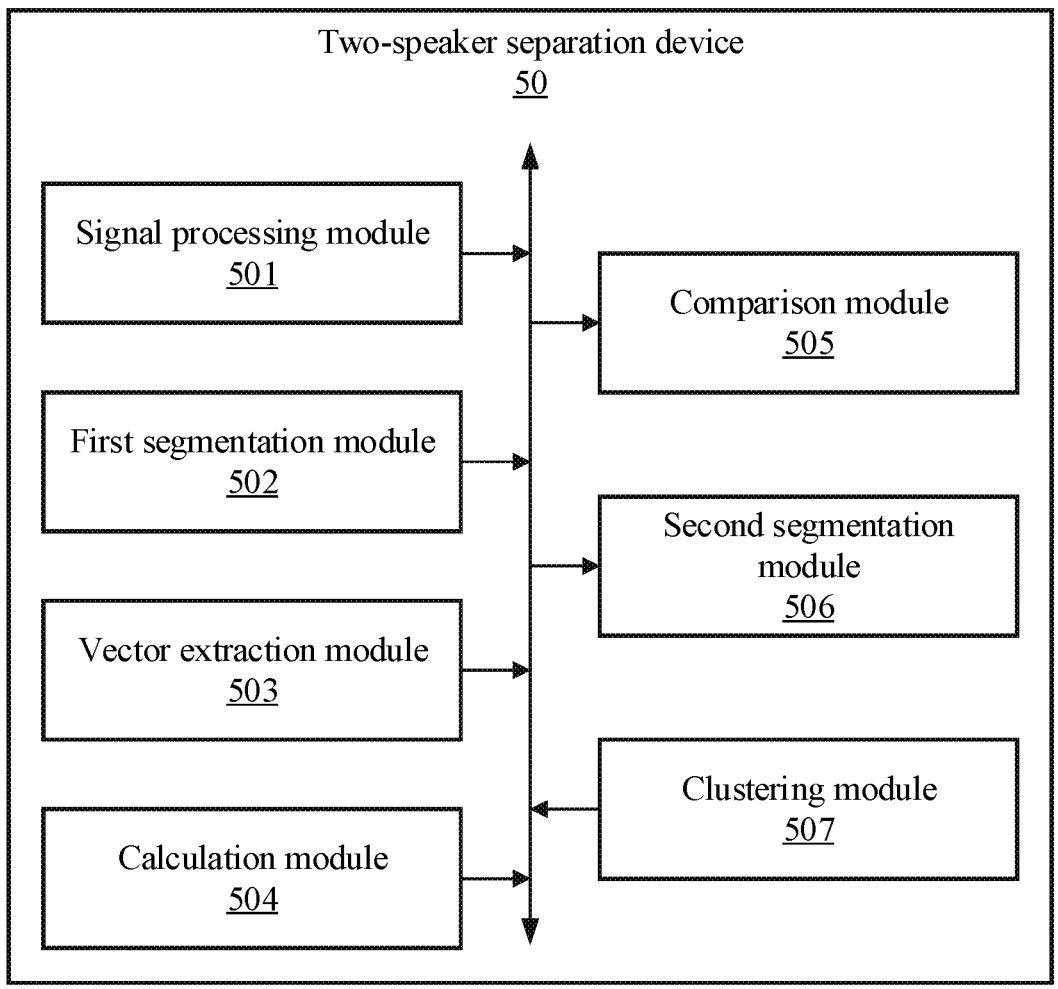
FIG. 5 shows a schematic structural diagram of a two-speaker separation device provided in an embodiment of the present disclosure.
Figure 6:
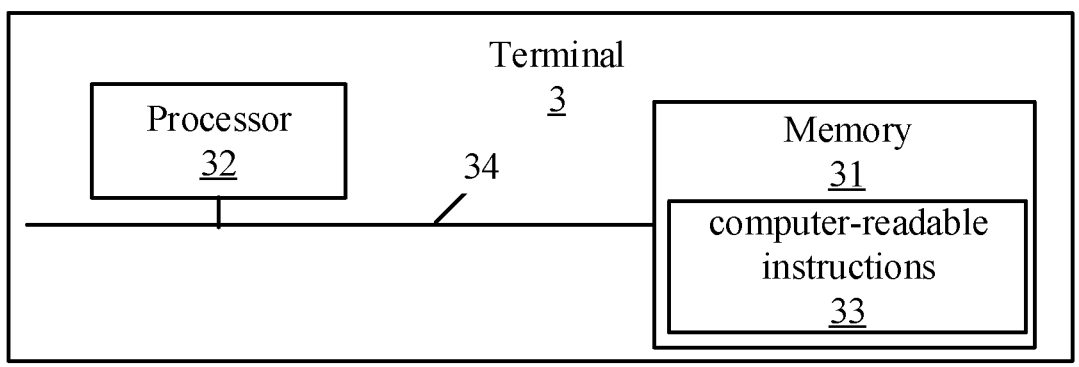
FIG. 6 shows a schematic structural diagram of a terminal provided in an embodiment of the present disclosure.

The following describes functional modules and hardware structure of a terminal that implements the above-mentioned speaker separation model training method and the two-speaker separation method, with reference to FIGS. 4-6.

Embodiment Three

FIG. 4 is a schematic structural diagram of a device in a preferred embodiment for speaker separation model training.

In some embodiments, the speaker separation model training device 40 runs in a terminal. The speaker separation model training device 40 can include a plurality of function modules consisting of program code segments. The program code of each program code segment in the speaker separation model training device 40 can be stored in a memory and executed by at least one processor to train the speaker separation model (described in detail in FIG. 1).

In the embodiment, the speaker separation model training device 40 in the terminal can be divided into a plurality of functional modules, according to the performed functions. The functional modules can include: an acquisition module 401, a processing module 402, a feature extraction module 403, a training module 404, a calculation module 405, and an update module 406. A module as referred to in the present disclosure refers to a series of computer-readable instruction segments that can be executed by at least one processor and that are capable of performing fixed functions, which are stored in a memory. In some embodiment, the functions of each module will be detailed in the following embodiments.

The acquisition module 401 is configured to acquire multiple speakers and a plurality of audio data for each speaker.

In the embodiment, the acquiring of the plurality of audio data may include the following two manners:

(1) An audio device (for example, a voice recorder, etc.) is set in advance, and the speeches of a plurality of people talking amongst themselves are recorded on-site through the audio device to obtain audio data.

(2) Acquire plurality of audio data from an audio data set.

The audio data set is an open source data set, such as a UBM data set and a TV data set. The open source audio data set is dedicated to training a speaker separation model and testing an accuracy of the trained speaker separation model. The UBM data set and the TV data set are from NIST04, NIST05 and NIST06, including about 500 h of audio data, recording a total of 577 speakers, with an average of about 15 sentences per person.

The processing module 402 is configured to process each of the plurality of audio data.

In the embodiment, after acquiring the plurality of audio data, processing of the plurality of audio data is required. The processing module 402 processing of the audio data includes one or more of the following combinations:

1) performing noise reduction processing on the audio data;

The acquired audio data may contain various noises. In order to extract purest audio data from the original noisy audio data, a low-pass filter can be used to remove white noise and random noise in the audio data.

2) performing voice activity detection on the noise-reduced audio data, and deleting invalid audio to obtain standard audio data samples:

In the embodiment, a dual-threshold comparison method can be used for voice activity detection to detect valid audio and invalid audio in the audio data. The valid audio is voices speaking, and the invalid audio is relative to the valid audio, including but not limited to, mute passages which are recorded.

3) labeling the standard audio data samples to indicate the speaker to which each of the standard audio data samples belongs.

A label refers to an identity attribute tag representing the audio data. For example, a first audio data of speaker A is labeled with an identity attribute tag 01, a second audio data of speaker B is labeled with an identity attribute tag 02.

The feature extraction module 403 is configured to extract audio features of the processed audio data.

In the embodiment, Mel Frequency Cepstrum Coefficient (MFCC) spectral characteristics etc. can be used to extract the audio features of the processed audio data. The MFCC is known in the prior art and not described in detail in the present disclosure.

The training module 404 is configured to input the audio features into a preset neural network model for training, to obtain vector features.

In the embodiment, the preset neural network model is stacked using a neural network structure with a predetermined number of layers. The preset predetermined number of layers is a preset number of network layers. For example, 9-12 layers in a neural network structure are set in advance to train a neural network training model.

Specifically, each layer of the neural network structure includes: a first convolution layer, a first modified linear unit, a second convolution layer, and a second modified linear unit, an average layer, a fully connected layer, and a normalization layer. A convolution kernel of the convolution layer is 3*3, a step size is 1*1, and a number of channels is 64;

A specific process of training the preset neural network model based on the input audio features includes:

1) inputting the audio feature into the first convolution layer to perform a first convolution process to obtain a first convolution feature;

2) inputting the first convolution feature into the first modified linear unit to perform a first modified process to obtain a first modified feature;

3) inputting the first modified feature into the second convolution layer to perform a second convolution process to obtain a second convolution feature;

4) summing the audio feature and the second convolution feature and inputting the sum into the second modified linear unit to obtain a second modified feature;

5) inputting the second modified feature to the average layer, the fully connected layer, and the normalization layer in order to obtain a one-dimensional vector feature.

A function of the average layer can be as a temporary pool ("temporary pool" used to calculate an average value of vector sequences along the time axis). The average layer calculates an average value of vector sequences output from a previous long-term short-term memory network to obtain a forward average vector and an average value of vector sequences output from a backward long-term short-term memory network to obtain a backward average vector. The fully connected layer concatenates the forward average vector and the backward average vector into one vector. The normalization layer uses a normalization function to process the concatenated vector to obtain a normalized one-dimensional vector feature with a length of 1.

In the embodiment, the normalization function can be a Euclidean distance function, a Manhattan distance function, and a minimum absolute error function. Optionally, the Euclidean distance function is used to normalize the concatenated vector processed by the fully connected layer to obtain a normalized one-dimensional vector feature. The normalization process can compress the concatenated vector process by the fully connected layer, so that the concatenated vector processed by the fully connected layer is robust, thereby further improving a robustness of the speaker separation model. In addition, the normalization using the Euclidean distance function prevents the speaker separation model from overfitting, thereby improving a generalization ability of the speaker separation model. Subsequently optimizing neural network parameters in the speaker separation model becomes more stable and faster.

The calculation module 405 is configured to select a first vector feature and a second vector feature of a first speaker, and calculate a first similarity value between the first vector feature and the second vector feature according to a preset first similarity function.

In the embodiment, the preset first similarity function can be a cosine similarity function, as shown (in formula (1-1)) below:

$$\mathrm{COS}(x_i, x_j) = x_i^T x_j \qquad (1\text{-}1)$$

Wherein, $x_i$ represents the first vector feature of the first speaker, $x_j$ represents the second vector feature of the first speaker and $\mathrm{COS}(x_i, x_j)$ is the calculated first similarity value.

The calculation module 405 is also configured to select a third vector feature of a second speaker, and calculate a second similarity value between the first vector feature and the third vector feature according to a preset second similarity function.

In the embodiment, the preset second similarity function can be same as or different from the preset first similarity function.

Optionally, the preset second similarity function is an LP norm, as shown in the following formula (1-2):

$$L_p(x_i, y_i) = \left(\sum_{i=1}^{n} |x_i - y_i|^p\right)^{1/p} \tag{1-2}$$

Wherein, $x_i$ represents the first vector feature of the first speaker, $y_i$ represents the third vector feature of the second speaker, and $L_p(x_i, y_i)$ is the calculated second similarity value, n is a number of binary arrays (xi, yi).

The update module 406 is configured to input the first similarity value and the second similarity value into a preset loss function to calculate a loss function value. When the loss function value is less than or equal to a preset loss function threshold, the training process of the speaker separation model is ended, and parameters in the speaker separation model are updated.

In the embodiment, the preset loss function can be as shown in the following formula (1-3):

$$L = \sum_{i}^{N} \max(S_i^{13} - S_i^{12} + \alpha, 0) \tag{1-3}$$

wherein, α is a normal number and generally ranges front 0.05 to 0.2. $S_i^{13}$ is the second similarity value, that is, a value of similarity between the first vector feature of the first speaker and the third vector feature of the second speaker. $S_i^{12}$ is the first similarity value, that is, a similarity between the first vector feature of the first speaker and the second vector feature of the first speaker. L is the calculated loss function value, N is a number of ternary array (xi, xj, yi).

The present disclosure acquires a plurality of audio data as training samples and labels the audio data. Audio features of the audio data are extracted. Vector features are obtained by inputting the audio features into a preset neural network model for training. A first vector feature and a second vector feature of a first speaker are selected, and a first similarity value between the first vector feature and the second vector feature is calculated according to a preset first similarity function. A third vector feature of a second speaker is selected, and a second similarity value between the first vector feature and the third vector feature is calculated according to a preset second similarity function. The first similarity value and the second similarity value are inputted into a preset loss function to calculate a loss function value; and when the loss function value is less than or equal to a preset loss function threshold, the training process of the speaker separation model is ended, and parameters in the speaker separation model are updated. The speaker separation model for training based on the convolutional neural network in the present disclosure has strong feature extraction capabilities, which reduces a risk of performance degradation when the network level deepens. In addition, vector features of different audio data of the same speaker can be guaranteed to be the same as much as possible, and vector features of the audio data of different speaker are as different as possible, so that the calculated loss function can match the convergence condition faster and record and save the speaker. Training time of the speaker separation model is saved, and a separation efficiency of the speaker separation model is improved.

Embodiment Four

FIG. 5 is a schematic structural diagram of a preferred embodiment of a two-speaker separation device of the present disclosure.

In some embodiments, the two-speaker separation device 50 runs in a terminal. The two-speaker separation device 50 can include a plurality of function modules consisting of program code segments. The program code of each program code segments in the two-speaker separation device 50 can be stored in a memory and executed by at least one processor to perform separation of speech signals of two speakers to obtain two speech segments. Each segment of speech contains the speech of only one speaker (described in detail in FIG. 2).

In the embodiment, the two-speaker separation device 50 in the terminal can be divided into a plurality of functional modules, according to the performed functions. The functional modules can include: a signal processing module 501, a first segmentation module 502, a vector extraction module 503, a calculation module 504, a comparison module 505, a second segmentation module 506, and a clustering module 507. A module as referred to in the present disclosure refers to a series of computer-readable instruction segments that can be executed by at least one processor and that are capable of performing fixed functions, which are stored in a memory. In some embodiment, the functions of each module will be detailed in the following embodiments.

The above-mentioned integrated unit implemented in a form of software functional modules can be stored in a non-transitory readable storage medium. The above software function modules are stored in a storage medium and includes several instructions for causing a computer device (which can be a personal computer, a dual-screen device, or a network device) or a processor to execute the method described in various embodiments in the present disclosure.

The signal processing module 501 is configured to process a speech signal to be separated.

In the embodiment, a process of the signal processing module 501 processing the speech signal to be separated includes:

1) Pre-Emphasis Processing

In the embodiment, a digital filter can be used to perform pre-emphasis processing on the speech signal to be separated to improve a speech signal of the high-frequency part. The details are shown below in formula (2-1):

$$\tilde{S}(n) = S(n) - a * S(n-1) \tag{2-1}$$

wherein, S(n) is the speech signal to be separated, a is a pre-emphasis coefficient and 0.95 is generally taken, and $\tilde{S}(n)$ is a speech signal after the pre-emphasis processing.

Due to factors such as human vocal organs and equipment that collects speech signals, problems such as aliasing and higher-order harmonic distortion readily appear in the collected speech signals. By Pre-emphasis processing of the speech signal to be separated, the high-frequency parts of the speech signal that are suppressed by the pronunciation system can be compensated, and the high-frequency formants are highlighted to ensure that the speech signal to be separated is more uniform and smoother, and improve actual separation of the speech signal to be separated.

2) Framed Processing

The speech signal to be separated can be framed according to a preset framing parameter. The preset framing parameter can be, for example, a frame length of 10-30 ms. Optionally, the speech signal to be separated is framed every 25 milliseconds to obtain a plurality of speech frames. For the speech signal to be separated, each speech frame obtained after framing is a characteristic parameter time series composed of the characteristic parameters of each frame.

The first segmentation module 502 is configured to establish a first sliding window and a second sliding window that are adjacent to each other and slid from a starting position of the processed speech signal. This obtains a first speech segment and a second speech segment according to segmentation point of the first sliding window and the second sliding window.

In the embodiment, a length of the first sliding window and the second sliding window can be 0.7-2 seconds. A segmentation point between the first sliding window and the second sliding window is a possible speaker dividing point of the processed voice signal. The first sliding window corresponds to the first speech segment, and the second sliding window corresponds to the second speech segment. The segmentation point between the first sliding window and the second sliding window is also the segmentation point between the first speech segment and the second speech segment.

The vector extraction module 503 is configured to input the first speech segment into a speaker separation model to extract feature to obtain a first speech vector, and input the second speech segment into the speaker separation model to extract feature to obtain a second speech vector.

The first speech segment is inputted into the trained speaker separation model, and the trained speaker separation model extracts an MFCC(Mel Frequency Cepstrum Coefficient) of the first speech segment to obtain a first speech vector. The second speech segment is inputted into the trained speaker separation model and the trained speaker separation model extracts an MFCC of the second speech segment to obtain a second speech vector.

The calculation module 504 is configured to calculate a distance value between the first speech vector and the second speech vector as a distance value corresponding to the segmentation point.

In the embodiment, a preset distance function can be used to calculate a distance value between each first speech vector and each corresponding second speech vector.

The preset distance function is a preset distance function, and can be, for example, a Euclidean distance. A process of calculating the distance value of the first speech vector and the second speech vector by using the European distance function is not described in the present disclosure.

Moving the first sliding window and the second sliding window simultaneously along a time axis direction for a preset time period, and the above-mentioned modules (502-504) are repeatedly executed until the second sliding window reaches the end of the pre-processed speech signal.

In the embodiment, the preset time period can be 5 ms. By sliding the first sliding window and the second sliding window on the processed voice signal, a plurality of segmentation points of the sliding window can be obtained, thereby obtaining a plurality of first speech fragments and a plurality of second speech fragments. That is, each time the first sliding window and the second sliding window are slid at the same time according to the preset time period, a candidate segmentation point is obtained. Each candidate segmentation point is the segmentation point of the first speech segment and the second speech segment, and a distance value can be calculated correspondingly. How many segmentation point there are will correspond to how many distance values there are.

The comparison module 505 is configured to acquire distance value corresponding to each segmentation point, and determine local maximum values according to all the distance values.

In the embodiment, a specific process of the comparison module 505 determining local maximum values according to all the distance values includes:

1) arranging the distance values corresponding to the division points in chronological order of the segmentation points;

determining $f(n')$ whether it is greater than $f(n'-1)$ and determining $f(n')$ whether it is greater than $f(n'+1)$, where $f(n')$ is a distance value corresponding to the segmentation point n', $f(n'-1)$ is a distance value corresponding to a segmentation point $(n'-1)$ before the segmentation point n', and $f(n'+1)$ is a distance value corresponding to a segmentation point $(n'+1)$ after the segmentation point n';

when $f(n') \geq f(n'-1)$ and $f(n') \geq f(n'+1)$, determining $f(n')$ is the local maximum.

A plurality of local maximum values can be determined, and a segmentation point corresponding to each local maximum value is a segmentation point to be found.

For example, suppose that 10 segmentation points are obtained according to the sliding of the first sliding window and the second sliding window, such as T1, T2, T3, T4, T5, T6, T7, T8, T9, and T10. Each segmentation points corresponds to a distance value, for example, S1, S2, S3, S4, S5, S6, S7, S8, S9, and S10. The 10 distance values are arranged in chronological order of the segmentation points. If S2>=S1 and S2>=S3, S2 is a local maximum value. Then determine whether S4>=S3, and S4>=S5. If S4>=S3, and S4>=S5, then S4 is a local maximum value. By analogy, the remaining current distance values are respectively determined from a previous distance value or a subsequent distance value to determine local maximum values.

In an alternative embodiment, the comparison module 505 determining of local maximum values according to all the distance values can include:

drawing a smooth curve with the segmentation points as the horizontal axis and the distance values corresponding to the segmentation points as the vertical axis;

calculating a slope of a tangent to each point on the curve;

determining as the local maximum a distance value corresponding to the point where the slope of the tangent is zero.

In order to visualize the local maximum values, a smooth curve can be drawn with the segmentation points as the horizontal axis and the distance values corresponding to the segmentation points as the vertical axis, as shown in FIG. 3. Solving a tangent of each point in FIG. 3 shows that a slope of the tangent of the points corresponding to S2, S4, S6, and S9 is zero, and S2, S4, S6, and S9 are determined as local maximum values.

The second segmentation module 506 is configured to segment the speech signal to be separated according to the segmentation points corresponding to the local maximum values to obtain new speech segments.

In the embodiment, after determining the local maximum values, the speech signal to be separated is again segmented by using the segmentation points corresponding to the local maximum values as a new segmentation point, so as to obtain a plurality of new speech fragments. A process of re-segmentation is to find time points of dialogue exchange between two different speakers from the speech signal to be separated, and then the speech signal to be separated can be segmented into several speech segments according to the time points. Each speech segment contains the speech of only one speaker.

For example, if S2, S4, S6, and S9 are the local maximum values, the corresponding segmentation points T2, T4, T6, and T9 are used as new segmentation points to segment the speech signal to be separated, to obtain 5 new speech segments. Each new speech segment contains only one speaker's speech.

The clustering module 507 is configured to cluster the new speech segments into speech segments of two speakers.

All speech segments belonging to one speaker are clustered by a clustering method and then recombined together.

In the embodiment, the clustering method can be a K-means clustering or a bottom-up hierarchical clustering (HAC). The clustering method is known in the prior art and is not described in detail in the present disclosure.

It can be known from the above that the present disclosure processes a speech signal to be separated. A first sliding window and a second sliding window that are adjacent to each other are established and sliding from a starting position of the processed speech signal. A first speech segment and a second speech segment are obtained according to segmentation point of the first sliding window and the second sliding window. The first speech segment is inputted into a speaker separation model to extract feature to obtain a first speech vector, and the second speech segment is inputted into the speaker separation model to extract feature to obtain a second speech vector. A distance value between the first speech vector and the second speech vector is calculated as a distance value corresponding to the segmentation point. The sliding window can be moved according to a preset time period, and each time the sliding window is moved, two speech fragments are obtained until the second sliding window reaches the end of the pre-processed voice signal and the distance value corresponding to each segmentation point is obtained. A local maximum according to the distance value is determined and the speech signal to be separated is segmented according to a segmentation point corresponding to the local maximum to obtain a new speech segment. The new speech segment is clustered into the respective speech of different speakers. In the present disclosure, a plurality of speech fragments are obtained through several sliding processes. The trained speaker separation model is used to extract features of the speech fragments. By comparing the calculated distance values to determine the local maximum values, the segmentation points corresponding to the local maximum values are used as new segmentation points to segment the speech signal to be separated again, and the speech fragments of the two speakers are obtained, and the separation is effective.

Embodiment Five

FIG. 6 is a schematic structural diagram of a terminal provided in embodiment 5 of the present disclosure.

The terminal 3 may include: a memory 31, at least one processor 32, computer-readable instructions 33 stored in the memory 31 and executable on the at least one processor 32, and at least one communication bus 34.

The at least one processor 32 executes the computer-readable instructions 33 to implement the steps in the speaker separation model training method and/or two speaker separation method described above.

Exemplarily, the computer-readable instructions 33 can be divided into one or more modules/units, and the one or more modules/units are stored in the memory 31 and executed by the at least one processor 32 to complete the speaker separation model training method and/or the two speaker separation method of the present disclosure. The one or more modules/units can be a series of computer-readable instruction segments capable of performing specific functions, and the instruction segments are used to describe execution processes of the computer-readable instructions 33 in the terminal 3.

The terminal 3 can be a computing device such as a desktop computer, a notebook, a palmtop computer, and a cloud server. Those skilled in the art will understand that the schematic diagram 3 is only an example of the terminal 3, and does not constitute a limitation on the terminal 3. Another terminal 3 may include more or fewer components than shown in the figures, or combine some components or have different components. For example, the terminal 3 may further include an input/output device, a network access device, a bus, and the like.

The at least one processor 32 can be a central processing unit (CPU), or can be other general-purpose processor, digital signal processor (DSPs), and application specific integrated circuit (ASIC), Field-Programmable Gate Array (FPGA), or other programmable logic device, discrete gate, or transistor logic device, or discrete hardware component, etc. The processor 32 can be a microprocessor, or the processor 32 can be any conventional processor. The processor 32 is a control center of the terminal 3, and connects various parts of the entire terminal 3 by using various interfaces and lines.

The memory 31 can be configured to store the computer-readable instructions 33 and/or modules/units. The processor 32 may run or execute the computer-readable instructions and/or modules/units stored in the memory 31, and may call data stored in the memory 31 to implement various functions of the terminal 3. The memory 31 mainly includes a storage program area and a storage data area. The storage program area may store an operating system, an application program required for at least one function (such as a sound playback function, an image playback function, etc.), etc. The storage data area may store data (such as audio data, a phone book, etc.) created according to use of the terminal 3. In addition, the memory 31 may include a high-speed random access memory, and may also include a non-transitory storage medium, such as a hard disk, an internal memory, a plug-in hard disk, a smart media card (SMC), and a secure digital (SD) Card, a flash card, at least one disk storage device, a flash memory device, or other non-transitory solid-state storage device.

When the modules/units integrated in the terminal 3 are implemented in the form of software functional units and sold or used as independent products, they can be stored in a non-transitory readable storage medium. Based on this understanding, all or part of the processes in the methods of the above embodiments implemented by the present disclosure can also be completed by related hardware instructed by computer-readable instructions. The computer-readable instructions can be stored in a non-transitory readable storage medium. The computer-readable instructions, when executed by the processor, may implement the steps of the foregoing method embodiments. The computer-readable instructions include computer-readable instruction codes, and the computer-readable instruction codes can be in a source code form, an object code form, an executable file, or some intermediate form. The non-transitory readable storage medium can include any entity or device capable of carrying the computer-readable instruction code, a recording medium, a U disk, a mobile hard disk, a magnetic disk, an optical disk, a computer memory, a read-only memory (ROM).

In several embodiments provided in the preset application, it should be understood that the disclosed terminal and method can be implemented in other ways. For example, the embodiments of the devices described above are merely illustrative. For example, divisions of the units are only logical function divisions, and there can be other manners of division in actual implementation.

In addition, each functional unit in each embodiment of the present disclosure can be integrated into one processing unit, or can be physically present separately in each unit, or two or more units can be integrated into one unit. The above integrated unit can be implemented in a form of hardware or in a form of a software functional unit.

The present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim. Furthermore, the word "comprising" does not exclude other units nor does the singular exclude the plural. A plurality of units or devices stated in the system claims may also be implemented by one unit or device through software or hardware. Words such as first and second are used to indicate names, but not in any particular order.

Finally, the above embodiments are only used to illustrate technical solutions of the present disclosure, and are not to be taken as restrictions on the technical solutions. Although the present disclosure has been described in detail with reference to the above embodiments, those skilled in the art should understand that the technical solutions described in one embodiments can be modified, or some of technical features can be equivalently substituted, and that these modifications or substitutions are not to detract from the essence of the technical solutions or from the scope of the technical solutions of the embodiments of the present disclosure.

We claim:

1. A speaker separation model training method, the method comprising:
    acquiring multiple speakers and a plurality of audio data for each speaker;
    processing each of the plurality of audio data;
    extracting audio features of the processed audio data;
    inputting the audio features into a preset neural network model for training to obtain vector features;
    selecting a first vector feature and a second vector feature of a first speaker, and calculating a first similarity value between the first vector feature and the second vector feature according to a preset first similarity function;
    selecting a third vector feature of a second speaker, and calculating a second similarity value between the first vector feature and the third vector feature according to a preset second similarity function;
    inputting the first similarity value and the second similarity value into a preset loss function to calculate a loss function value; and when the loss function value is less than or equal to a preset loss function threshold, ending the training process of the speaker separation model, and updating parameters in the speaker separation model.

2. The speaker separation model training method of claim 1, wherein the method of processing the audio data comprises:
    performing noise reduction processing on the audio data;
    performing voice activity detection on the noise-reduced audio data, and deleting invalid audio to obtain standard audio data samples;
    labeling the standard audio data samples to indicate the speaker to which the standard audio data samples belongs.

3. The speaker separation model training method of claim 2, wherein the preset neural network model is stacked using a neural network structure with a predetermined number of layers; the layers of the neural network structure comprising: a first convolution layer, a first modified linear unit, a second convolution layer, and a second modified linear unit, an average layer, a fully connected layer, and a normalization layer, a convolution kernel of the convolution layer is 3*3, a step size is 1*1, and a number of channels is 64;
    wherein the method of obtaining vector features by inputting the audio features into a preset neural network model for training comprises:
    inputting the audio feature into the first convolution layer to perform a first convolution process to obtain a first convolution feature;
    inputting the first convolution feature into the first modified linear unit to perform a first modified process to obtain a first modified feature;
    inputting the first modified feature into the second convolution layer to perform a second convolution process to obtain a second convolution feature;
    summing the audio feature and the second convolution feature and inputting the sum into the second modified linear unit to obtain a second modified feature;
    inputting the second modified feature to the average layer, the fully connected layer, and the normalization layer in order to obtain a one-dimensional vector feature.

4. The speaker separation model training method of claim 1, wherein the preset first similarity function is $COS(x_i, x_j) = x_i^T x_j$, $x_i$ represents the first vector feature of the first speaker, $x_j$ represents the second vector feature of the first speaker, $COS(x_i, x_j)$ is the calculated first similarity value, the preset second similarity function is $L_p$ norm:

$$L_p(x_i, y_i) = \left(\sum_{i=1}^{n} |x_i - y_i|^p\right)^{1/p},$$

$y_i$ represents the third vector feature of the second speaker, $L_p(x_i, y_i)$ is the calculated second similarity value, n is a number of binary arrays (xi, yi).

5. The speaker separation model training method of claim 4, the preset loss function is $$L = \sum_{i}^{N} \max(S_i^{13} - S_i^{12} + \alpha, 0),$$

α is a normal number, $S_i^{13}$ is the second similarity value, $S_i^{12}$ is the first similarity value, L is the calculated loss function value, N is a number of ternary array (xi, xj, yi).

6. A two-speaker separation method, the method comprising:
1) processing a speech signal to be separated;
2) establishing a first sliding window and a second sliding window that are adjacent to each other and sliding from a starting position of the processed speech signal, and obtaining a first speech segment and a second speech segment according to a segmentation point of the first sliding window and the second sliding window;
3) inputting the first speech segment into a speaker separation model to extract features to obtain a first speech vector, and inputting the second speech segment into the speaker separation model to extract feature to obtain a second speech vector, where the speaker separation model is trained by using the method according to claim 1;
4) calculating a distance value between the first speech vector and the second speech vector as a distance value corresponding to the segmentation point;
5) moving the first sliding window and the second sliding window simultaneously along a time axis direction for a preset time period, and repeating steps 2)-5) until the second sliding window reaches an end of the processed speech signal;
6) acquiring distance values corresponding to each segmentation point, and determining local maximum values according to all the distance values;
7) segmenting the speech signal to be separated according to the segmentation points corresponding to the local maximum values to obtain new speech segments;
8) clustering the new speech segments into speech segments of two speakers.

7. The two-speaker separation method of claim 6, wherein the method of determining local maximum values according to all the distance values comprises:
arranging the distance values corresponding to the division points in chronological order of the segmentation points;
determining whether f(n') is greater than f(n'−1) and determining whether f(n') is greater than f(n'+1), where f(n') is a distance value corresponding to a segmentation point n', f(n'−1) is a distance value corresponding to a segmentation point (n'−1) before the segmentation point n', and f(n'+1) is a distance value corresponding to a segmentation point (n'+1) after the segmentation point n';
when f(n')≥f(n'−1) and f(n') f(n'+1), determining f(n') is the local maximum.

8. The two-speaker separation method of claim 6, wherein the method of determining local maximum values according to all the distance values comprises:
drawing a smooth curve with the segmentation points as the horizontal axis and the distance values corresponding to the segmentation points as the vertical axis;
calculating a slope of a tangent to each point on the curve;
determining a distance value corresponding to the point where the slope of the tangent is zero as the local maximum.

9. A terminal comprising a processor and a storage device, and the processor executes computer-readable instructions stored in the storage device to implement the following method:
acquiring multiple speakers and a plurality of audio data for each speaker;
processing each of the plurality of audio data;
extracting audio features of the processed audio data;
inputting the audio features into a preset neural network model for training to obtain vector features;
selecting a first vector feature and a second vector feature of a first speaker, and calculating a first similarity value between the first vector feature and the second vector feature according to a preset first similarity function;
selecting a third vector feature of a second speaker, and calculating a second similarity value between the first vector feature and the third vector feature according to a preset second similarity function;
inputting the first similarity value and the second similarity value into a preset loss function to calculate a loss function value; and
when the loss function value is less than or equal to a preset loss function threshold, ending the training process of the speaker separation model, and updating parameters in the speaker separation model.

10. The terminal of claim 9, wherein the method of processing the audio data comprises:
performing noise reduction processing on the audio data;
performing voice activity detection on the noise-reduced audio data, and deleting invalid audio to obtain standard audio data samples;
labeling the standard audio data samples to indicate the speaker to which the standard audio data samples belongs.

11. The terminal of claim 10, wherein the preset neural network model is stacked using a neural network structure with a predetermined number of layers; the layers of the neural network structure comprising: a first convolution layer, a first modified linear unit, a second convolution layer, and a second modified linear unit, an average layer, a fully connected layer, and a normalization layer, a convolution kernel of the convolution layer is 3*3, a step size is 1*1, and a number of channels is 64;
wherein the method of obtaining vector features by inputting the audio features into a preset neural network model for training comprises:
inputting the audio feature into the first convolution layer to perform a first convolution process to obtain a first convolution feature;
inputting the first convolution feature into the first modified linear unit to perform a first modified process to obtain a first modified feature;
inputting the first modified feature into the second convolution layer to perform a second convolution process to obtain a second convolution feature;
summing the audio feature and the second convolution feature and inputting the sum into the second modified linear unit to obtain a second modified feature;
inputting the second modified feature to the average layer, the fully connected layer, and the normalization layer in order to obtain a one-dimensional vector feature.

12. The terminal of claim 9, wherein the preset first similarity function is $COS(x_i, x_j) = x_i^T x_j$, $x_i$ represents the first vector feature of the first speaker, $x_j$ represents the second vector feature of the first speaker, $COS(x_i, x_j)$ is the calculated first similarity value, the preset second similarity function is $L_p$ norm:

$$L_p(x_i, y_i) = \left( \sum_{i=1}^{n} |x_i - y_i|^p \right)^{1/p},$$

$y_i$ represents the third vector feature of the second speaker, $L_p(x_i, y_i)$ is the calculated second similarity value, n is a number of binary arrays $(x_i, y_i)$.

13. The terminal of claim 12, the preset loss function is $$L = \sum_{i}^{N} \max(S_i^{13} - S_i^{12} + \alpha, 0),$$

$\alpha$ is a normal number, $S_i^{13}$ is the second similarity value, $S_i^{12}$ is the first similarity value, L is the calculated loss function value, N is a number of ternary array (xi, xj, yi).

14. The terminal of claim 9, further comprising:
1) processing a speech signal to be separated;
2) establishing a first sliding window and a second sliding window that are adjacent to each other and sliding from a starting position of the processed speech signal, and obtaining a first speech segment and a second speech segment according to a segmentation point of the first sliding window and the second sliding window;
3) inputting the first speech segment into a speaker separation model to extract features to obtain a first speech vector, and inputting the second speech segment into the speaker separation model to extract feature to obtain a second speech vector;
4) calculating a distance value between the first speech vector and the second speech vector as a distance value corresponding to the segmentation point;
5) moving the first sliding window and the second sliding window simultaneously along a time axis direction for a preset time period, and repeating steps 2)-5) until the second sliding window reaches an end of the processed speech signal;
6) acquiring distance values corresponding to each segmentation point, and determining local maximum values according to all the distance values;
7) segmenting the speech signal to be separated according to the segmentation points corresponding to the local maximum values to obtain new speech segments;
8) clustering the new speech segments into speech segments of two speakers.

15. The terminal of claim 14, wherein the method of determining local maximum values according to all the distance values comprises:
arranging the distance values corresponding to the division points in chronological order of the segmentation points;
determining whether f(n') is greater than f(n'−1) and determining whether f(n') is greater than f(n'+1), where f(n) f(n') is a distance value corresponding to a segmentation point n', f(n'−1) is a distance value corresponding to a segmentation point (n'−1) before the segmentation point n', and f(n'+1) is a distance value corresponding to a segmentation point (n'+1) after the segmentation point n';
when f(n')≥f(n'−1) and f(n') f(n'+1), determining f(n') is the local maximum.

\* \* \* \* \*